US009082307B2

(12) United States Patent
Sharawi et al.

(10) Patent No.: US 9,082,307 B2
(45) Date of Patent: Jul. 14, 2015

(54) CIRCULAR ANTENNA ARRAY FOR VEHICULAR DIRECTION FINDING

(71) Applicant: KING FAHD UNIVERSITY OF PETROLEUM AND MINERALS, Dhahran (SA)

(72) Inventors: Mohammad S. Sharawi, Dhahran (SA); Farooq Sultan Sultan Khan, Dhahran (SA); Daniel N. Aloi, Rochester, MI (US)

(73) Assignee: KING FAHD UNIVERSITY OF PETROLEUM AND MINERALS, Dhahran (SA)

( * ) Notice: Subject to any disclaimer, the term of this patent is extended or adjusted under 35 U.S.C. 154(b) by 240 days.

(21) Appl. No.: 13/771,048

(22) Filed: Feb. 19, 2013

(65) Prior Publication Data

US 2014/0232572 A1 Aug. 21, 2014

(51) Int. Cl.

| | |
|---|---|
| ***G08G 1/123*** | (2006.01) |
| ***G05B 11/01*** | (2006.01) |
| ***H01Q 9/26*** | (2006.01) |
| ***H01Q 9/28*** | (2006.01) |
| ***H01Q 1/36*** | (2006.01) |
| ***H01Q 9/04*** | (2006.01) |
| ***H01Q 9/16*** | (2006.01) |
| ***H01Q 19/24*** | (2006.01) |
| ***H01Q 21/20*** | (2006.01) |

(52) U.S. Cl.

CPC ................. *G08G 1/123* (2013.01); *H01Q 9/16* (2013.01); *H01Q 19/24* (2013.01); *H01Q 21/205* (2013.01)

(58) Field of Classification Search

USPC ..................................................... 340/539.32

See application file for complete search history.

(56) References Cited

U.S. PATENT DOCUMENTS

| | | | | |
|---|---|---|---|---|
| 3,803,623 | A | 4/1974 | Charlot, Jr. | |
| 4,219,821 | A | 8/1980 | Selim | |
| 6,295,035 | B1 | 9/2001 | Holzheimer | |
| 6,987,489 | B2 | 1/2006 | Melconian et al. | |
| 7,847,709 | B2 | 12/2010 | McCall et al. | |
| 8,068,065 | B1 | 11/2011 | Struckman | |
| 8,184,062 | B2 | 5/2012 | Hartenstein | |
| 2002/0018018 | A1* | 2/2002 | Fathy et al. | 343/700 MS |
| 2004/0257292 | A1* | 12/2004 | Wang | 343/833 |
| 2005/0088301 | A1* | 4/2005 | Abbruscato | 340/539.32 |
| 2008/0048909 | A1* | 2/2008 | Ioffe et al. | 342/357.07 |
| 2008/0267151 | A1* | 10/2008 | Hartenstein | 370/338 |
| 2008/0278347 | A1* | 11/2008 | Ho et al. | 340/928 |
| 2009/0231219 | A1* | 9/2009 | Sugimoto et al. | 343/713 |
| 2010/0214078 | A1 | 8/2010 | Chen et al. | |
| 2011/0148578 | A1* | 6/2011 | Aloi et al. | 340/8.1 |

FOREIGN PATENT DOCUMENTS

| | | |
|---|---|---|
| JP | 6-102334 | 4/1994 |

* cited by examiner

*Primary Examiner* — Jennifer Mehmood
*Assistant Examiner* — Pameshanand Mahase
(74) *Attorney, Agent, or Firm* — Richard C Litman

(57) ABSTRACT

The circular antenna array for vehicular direction finding applications is a circular disc having a plurality of microstrip antennas radially spaced around the disc at equal angles. In one embodiment, the circular antenna array includes V-shaped antennas, and in another embodiment, the antennas are Yagi antennas. The circular antenna array can operate under two modes, switched and phased, in the 2.45 GHz band with an operating bandwidth of at least 100 MHz. The circular antenna array is configured to be installed in vehicles. Selective transmittal of an RF signal from a key fob generates a response signal from a specific antenna element receiving the RF signal in line with the direction of origin thereof. An LED panel indicates proximity and direction to the vehicle being located.

10 Claims, 15 Drawing Sheets

CIRCULAR ANTENNA ARRAY FOR VEHICULAR DIRECTION FINDING

BACKGROUND OF THE INVENTION

1. Field of the Invention

The present invention relates to radio direction finding antennas, and particularly to a circular antenna array for vehicular direction finding.

2. Description of the Related Art

Wireless technology, such as radio frequency (RF) and direction finding (DF) systems, have been popular with the military since their first use in World War II. Traditionally these systems were used in war zones to detect the presence of unwanted transmitters, a term commonly referred to in the military as "fox hunting". This process involved rotating a directional antenna across the 360° azimuth plane to find the most probable direction of unwanted transmission. If the "fox" transmitted for long enough, its position could be located quite accurately. More recently, direction finding has been utilized in civilian applications including disaster recovery, wildlife tracking and locating illegal transmitters in licensed frequency bands. One emerging application of direction finding is to locate a car in a huge parking lot; utilizing antenna beam scanning and transmission of beacon signals.

The majority of the initial direction finding antenna systems used multiple channel receiver systems, where every antenna element on the array had a corresponding receiver. These systems were bulky and consumed too much power, and in some cases, were impractical due to mobility related issues. Recent advances in integrated chip (IC) and digital signal processing (DSP) technologies have given rise to small, portable and highly versatile single-channel DF systems. In order to accurately determine the position of the object in the far-field of the antenna, it is desired to have a high gain (in the desired plane) and extremely narrow half-power beamwidths (HPBW). Moreover, the scanning angle can be increased by modifying the geometry of the antenna array. Linear antenna arrays have a maximum scan angle of 180°, but as the array becomes two-dimensional (by adding elements in both planes), the scan angle can be increased to 360°. Circular antenna arrays are an example of antenna arrays with a 360° scan angle. The selection of the antenna elements constituting the array is made on the basis of the individual radiation characteristics of the respective element types.

As mentioned above, it is desirable for antenna elements to have narrow HPBW and high gains for high accuracy. Several antenna array designs exist, but none appear to have actually been designed specifically for direction finding with vehicle localization as its application.

Thus, a circular antenna array for vehicular direction finding solving the aforementioned problems is desired.

SUMMARY OF THE INVENTION

The circular antenna array for vehicular direction finding is a circular disc having a plurality of microstrip antenna elements radially formed on the disc. In one embodiment, the circular antenna array includes V-shaped antenna elements. In another embodiment, the array has Yagi antenna elements. The circular antenna array can operate under two modes, switched and phased, in the 2.45 GHz band with an operating bandwidth of at least 100 MHz. The circular antenna array is configured to be installed in vehicles. Selective transmittal of an RF signal from a key fob generates a response signal from one of the antenna elements in the array receiving the key fob signal in line with the direction of origin thereof. An LED panel indicator on the key fob indicates proximity to the vehicle being located.

These and other features of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
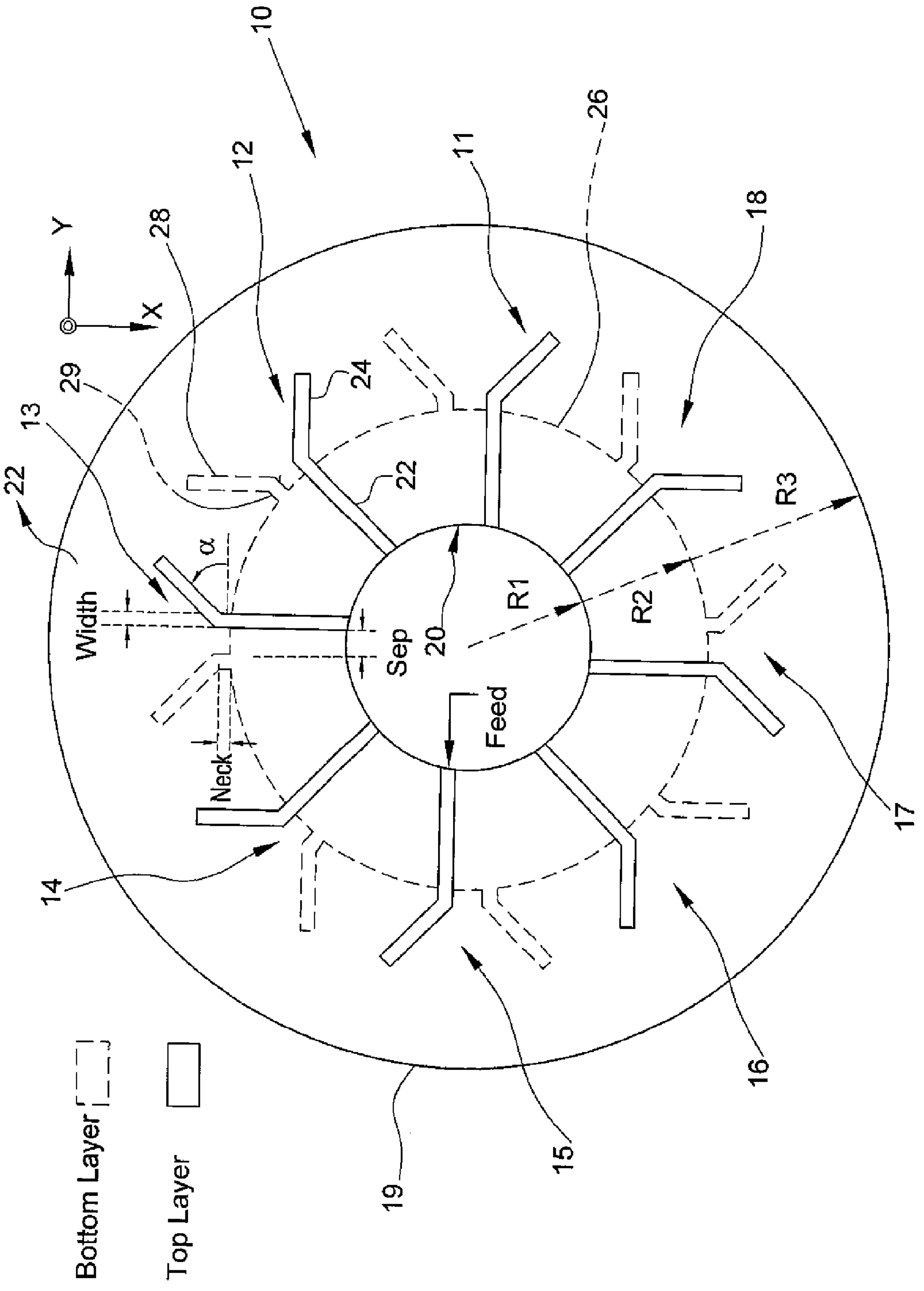
FIG. 1 is a plan view of a first embodiment of a circular antenna array for vehicular direction finding according to the present invention having V-shaped antenna elements.

The circular antenna array for vehicular direction finding, a first embodiment of which is generally referred to by the reference number 10, provides a compact antenna array that blends well into the aesthetics of a vehicle and facilitates location of the vehicle with minimal effort. As shown in FIG.

1, the circular antenna array 10 includes a circular disc 19 constructed from non-conducting dielectric material, such as a printed circuit board (PCB), silica, and the like, with a given ∈r (dielectric constant). In this embodiment, the ∈r for the disc 19 is about 3.8, and the dimensions of the disc 19 are about 200 mm in diameter (radius R3 of 100 mm) and 0.8 mm in thickness.

A plurality of V-shaped microstrip antennas 11-18 have been formed on opposite sides of the disc 19. The antennas are radially spaced at equal angles about the disc 19. On the top side or layer, each V-shaped antenna 11-18 includes a top leg element 22 extending radially from a center hole 20 that preferably has a radius R1 of about 25 mm, and an angled top arm element 24. The arm element 24 is about 20 mm long and extends at an angle $\alpha$ of about 30° from the perpendicular to the leg 22. The width for the top leg element 22 and the top arm element 24 is preferably about 1.5 mm.

On the bottom side or layer, a concentric circular ground plane 26 is formed, from which a plurality of bottom antenna ends for the V-shaped antenna 11-18 extend. The circular ground plane preferably has a radius R2 of about 51 mm. Each V-shaped antenna 11-18 includes an angled bottom arm element 28 extending from a radial bottom neck element 29. The angular measure of the bottom arm 28 is the same as the top arm 24, but extends in the mirror opposite direction when viewed from the top of the disc 19. The extension of the bottom neck 29 is preferably about 3 mm from the circumference of the circular ground plane 26. A linear separation of about 7 mm exists between the bottom neck 29 and the top leg 22.

As mentioned previously, each combination of top leg 22, top arm 24, bottom neck 29 and bottom arm 28 elements form or define a single V-shaped antenna. In this embodiment, the circular antenna array 10 includes eight V-shaped antennas. The microstrip antenna elements are formed from a conductive material, such as copper, clad on the disc substrate. Each V-shaped antenna 11-18 is provided with SMA (subminiature A) connectors to provide the necessary excitations, as indicated by Feed in FIG. 1. It is noted that though the bottom neck 29 and the top leg 22 elements lie along chordal lines (i.e., each bottom neck 29 is 180° opposite a corresponding top leg 22), they are disposed along the same median diametric line. Additionally, each V-shaped antenna 11-18 is identical in construction, and only one set of components has been accorded reference numbers for brevity and clarity.

Figure 2:
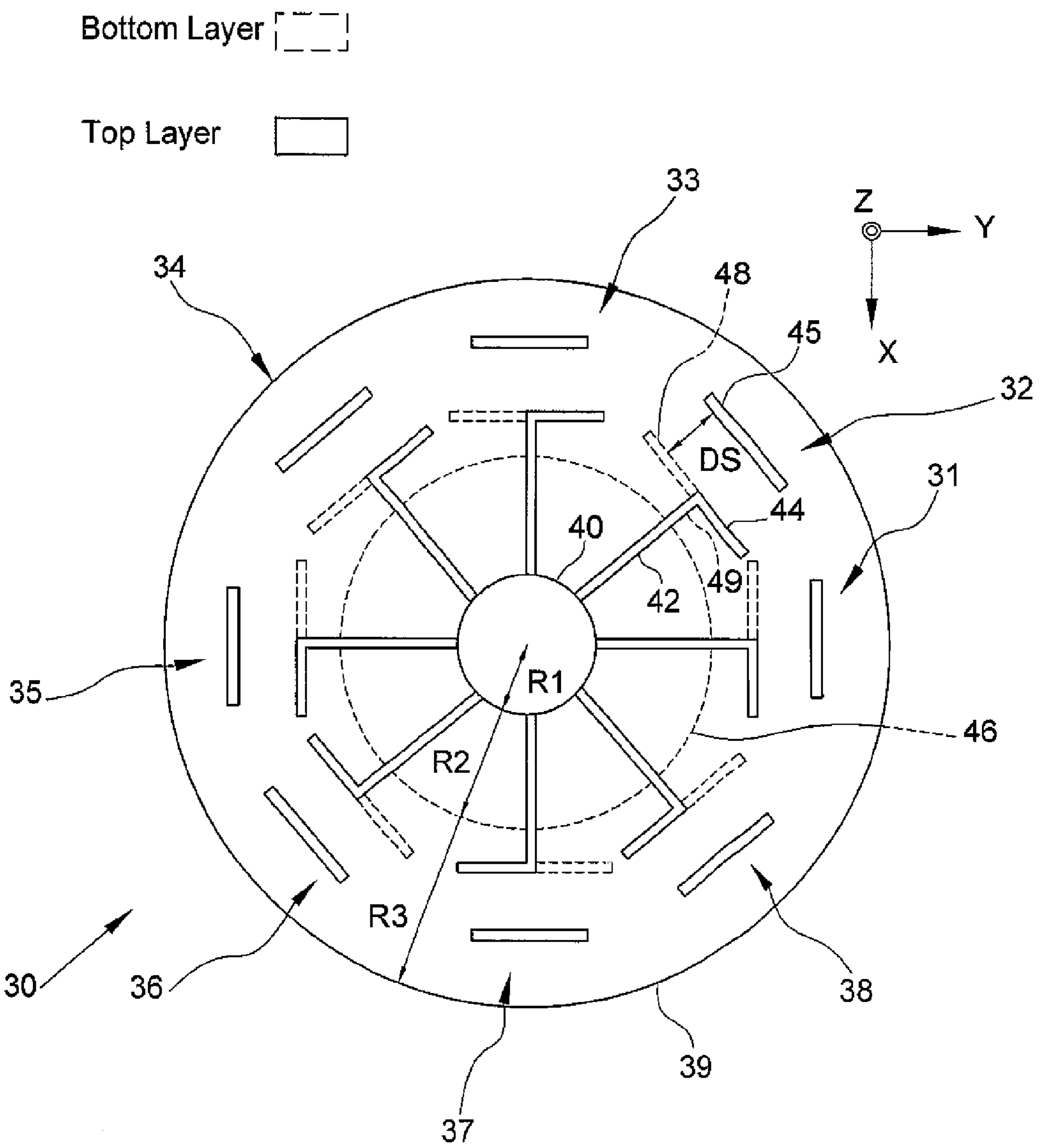
FIG. 2 is a plan view of a second embodiment of a circular antenna array for vehicular direction finding according to the present invention having Yagi antenna elements.

FIG. 2 shows an alternative circular antenna array 30, which is similar in construction to the above circular antenna array 10, except that the antennas are Yagi antennas. The circular antenna array 30 includes a circular disc 39 constructed from non-conducting dielectric material, such as a PCB, silica, and the like, with a given ∈r. In this embodiment, the ∈r for the disc 39 is about 3.8, and the dimensions of the disc 39 are about 200 mm in diameter (radius R3 of 100 mm) and 0.8 mm in thickness.

A plurality of microstrip Yagi antennas 31-38 have been formed on the disc 39. Each antenna is radially spaced at equal angles about the disc 39. On the top side or layer, each Yagi antenna 31-38 includes a top leg 42 (feed line) radiating from a center hole 40 that preferably has a radius R1 of about 25 mm, and a right-angled top arm 44 (driven element) extending from the top leg 42. The top leg 42 is preferably about 43 mm in length and the top arm 44 is about 26 mm. The width for the top leg 42 and top arm 44 is preferably about 1.5 mm. A director element strip 45 is disposed at a radial distance offset from the top arm 44 and extends parallel thereto. The distance separation DS is about 10 mm, and the length of the director strip 45 is preferably about 32 mm.

On the bottom side or layer, a concentric circular ground plane 46 is formed, from which a plurality of bottom components for the Yagi antenna elements 31-38 extend. The circular ground plane preferably has a radius R2 of about 51 mm. Unlike the V-shaped antenna elements 11-18, the bottom components for the Yagi antenna 31-38 lie directly below the top components, i.e. there is no lateral separation. As such, each Yagi antenna element 31-38 includes a right-angled bottom arm 48 (reflector element) extending from a radial bottom neck 49. The right-angled bottom arm 48 extends in the opposite direction from the extension of the right angled top arm 44.

As mentioned previously, each combination of top leg 42, top arm 44, bottom neck 49 and bottom arm 48 form or define a single Yagi antenna. In this embodiment, the circular antenna array 30 includes eight Yagi antennas. The microstrip antenna elements are formed from a conductive material, such as copper, clad on the disc substrate. Each Yagi antenna 31-38 is provided with SMA connectors to provide the necessary excitations. It is noted that since each Yagi antenna 31-38 is identical in construction, only one set of components has been accorded reference numbers for brevity and clarity.

Figure 3:
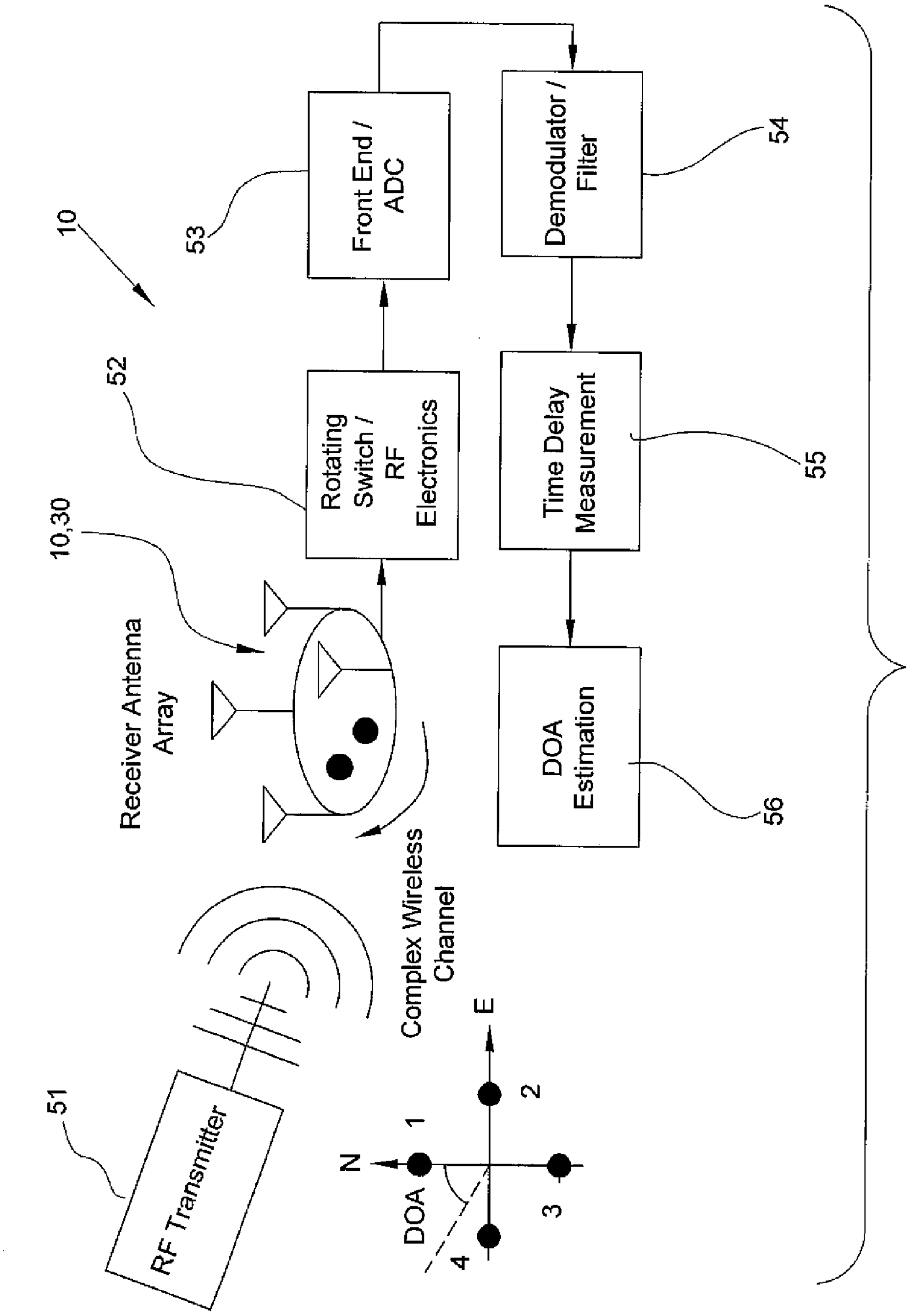
FIG. 3 is a block diagram of a circular antenna array for vehicular direction finding according to the present invention.
Figure 15:
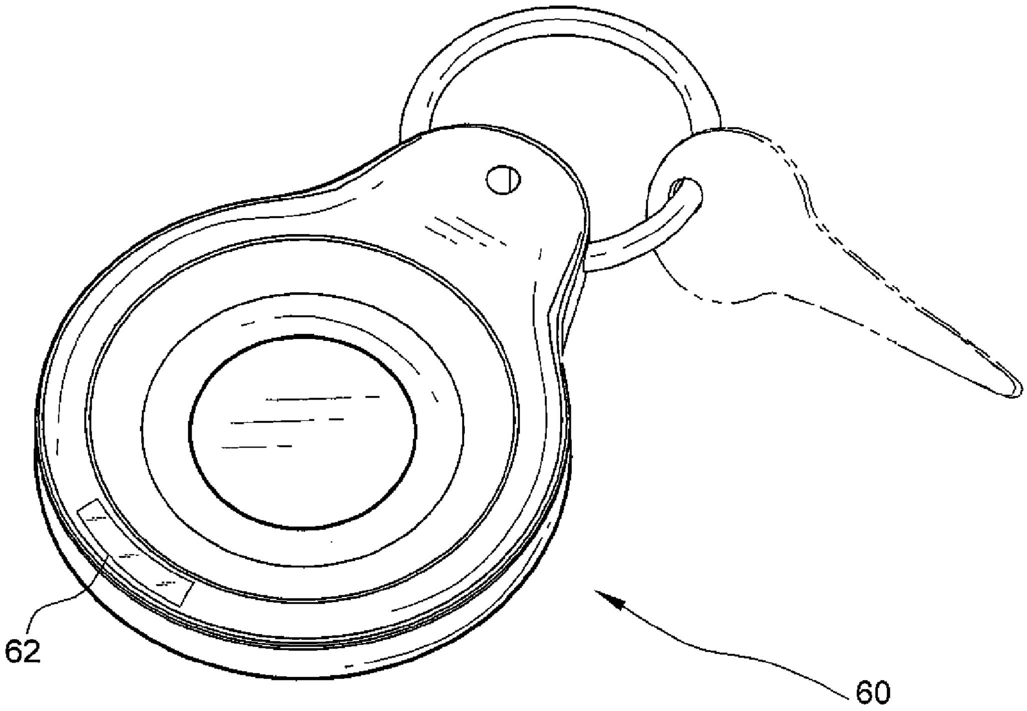
FIG. 15 is a perspective view of an exemplary key fob for use with a circular antenna array for vehicular direction finding according to the present invention.

Referring to FIG. 3, the diagram shows a block diagram of the receiver circuits. In operation, a single channel direction finding system for vehicular localization has been utilized. A radio transmitter 51 is embedded in a key fob 60 (shown in FIG. 15), which is carried by the user of a vehicle. Selective operation thereof sends out a beacon signal. The circular antenna array 10, 30 is preferably installed on the roof of the vehicle. A rotating switch 52 serves the purpose of activating each of the eight antennas of the antenna array one at a time. Once activated, the antenna array scans the sector corresponding to the activated antenna element to detect the presence of the beacon signal. The front end 53 includes signal amplification and conditioning circuitry (including an analog-to-digital converter) required to ensure a well-behaved signal is forwarded to the DSP (digital signal processor). The demodulator 54 down-converts the received signal from the carrier frequency of 2.45 GHz to the basic intermediate frequency (IF) range. After demodulating the signal, circuits for time delay 55 and direction of arrival (DOA) 56 estimation carry out the estimate after one complete cycle of antenna activation is complete. Based on the estimate provided by the DSP, the antenna element that received the beacon signal is determined and a response signal is broadcast through the same antenna element. This response, when received by the key fob 60, shown in FIG. 15, is indicated in the form of a light emitting diode (LED) panel 62 that signifies the intensity, thereby helping the user to get closer to the car.

With this process, the LED panel 62 can be configured in a variety of ways. Varying intensity of light emission can be correlated to the relative proximity of the user with respect to the vehicle. Additionally, the LED panel 62 can be provided with different colored LEDs where a specific color can also indicate proximity, e.g., red indicating far proximity and green indicating near proximity, or a simple array of LEDs displaying a colored spectrum, such as a gradual change to blue, indicating the user is too far, and/or a gradual change to red, indicating the user is close to the vehicle. Alternatively, the LED panel 62 can be constructed as an arcuate or circular array of LEDs in which a specific LED (or set of LEDs) activates in response to the specific antenna sending the signal. In other words, since the V-shaped and Yagi antenna elements are directional, the activated LED(s) will be one that is in line with the direction of the transmitting antenna element.

The following analysis and results describe the performance characteristics of the circular antenna arrays 10, 30. Both antenna arrays operate in the 2.45 GHz band with an operating bandwidth of at least 100 MHz.

Figure 4:
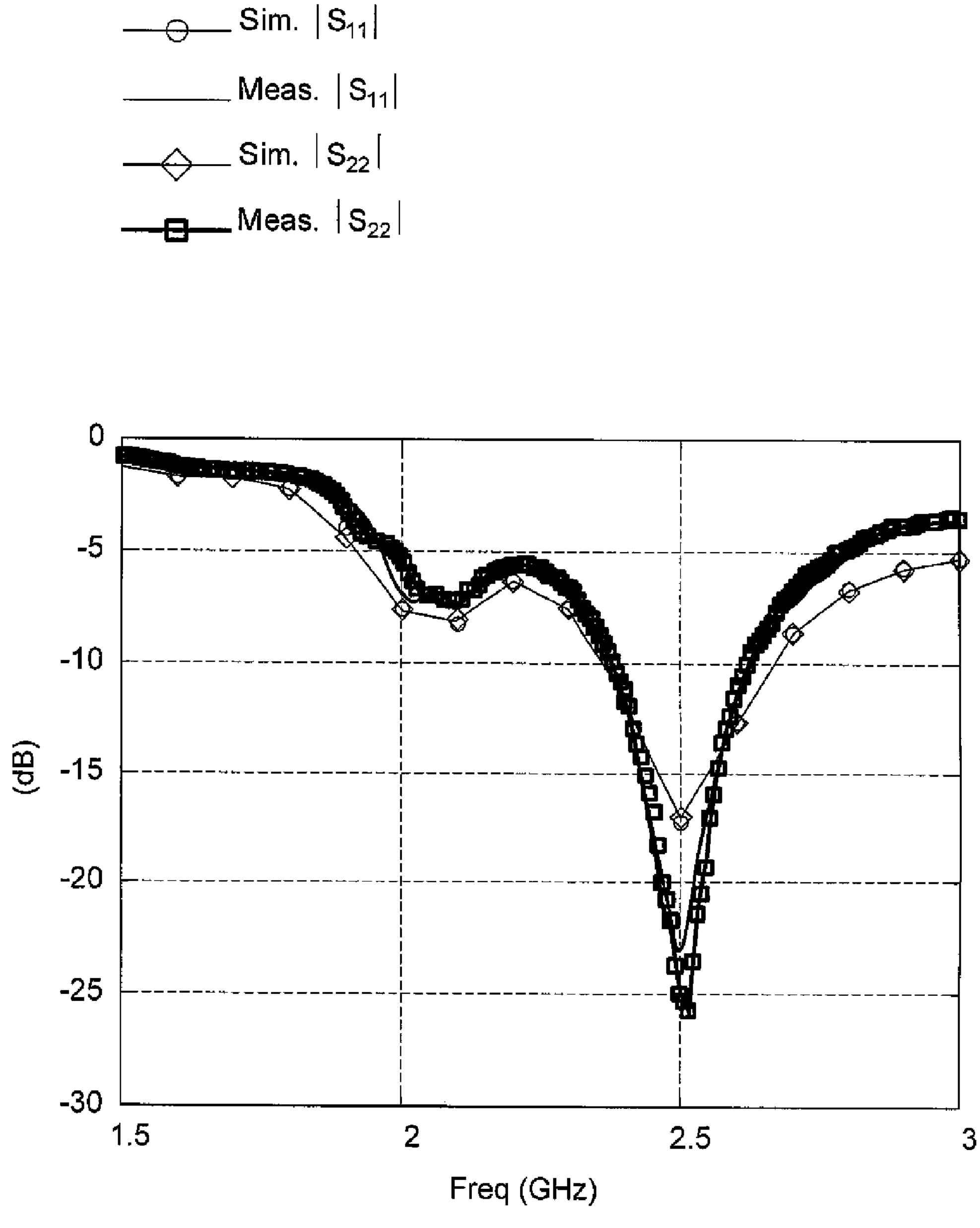
FIG. 4 is a graph showing a comparison of measured reflection coefficient for the circular antenna array of FIG. 1 with simulated reflection coefficient.
Figure 5:
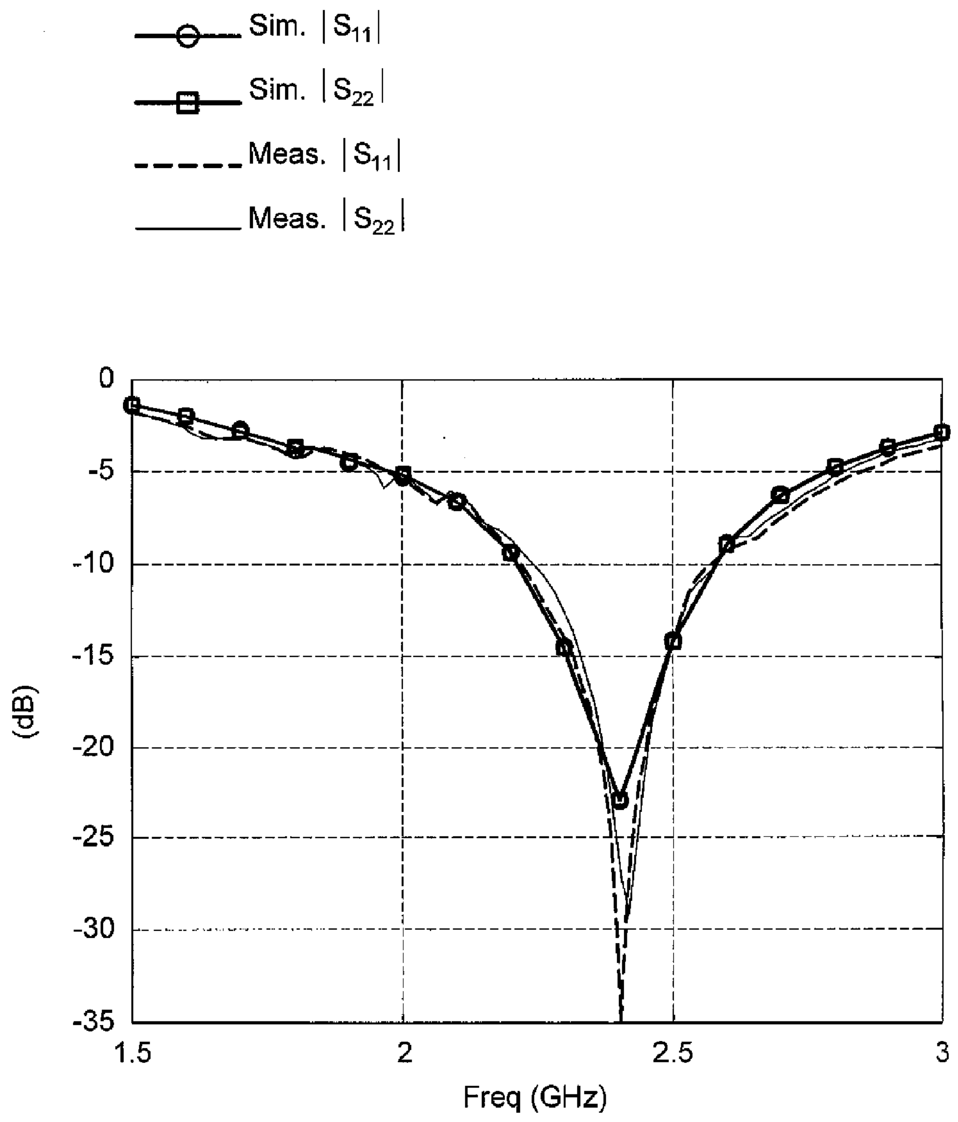
FIG. 5 is a graph showing a comparison of measured reflection coefficient for the circular antenna array of FIG. 2 with simulated reflection coefficient.

The reflection characteristics of the antenna arrays 10, 30 have been analyzed by comparing simulations of the antenna characteristics with the measured ones. As obvious from the simulated and measured reflection loss (|S11|) of FIG. 4, the V-shaped antenna array simulations and measurements correlate excellently with the antenna array radiating at the center frequency of 2.5 GHz. Strong agreement between the measurements and simulations is also observed when using the Yagi antenna elements with the antenna resonating at 2.45 GHz, as indicated by FIG. 5.

Figure 6:
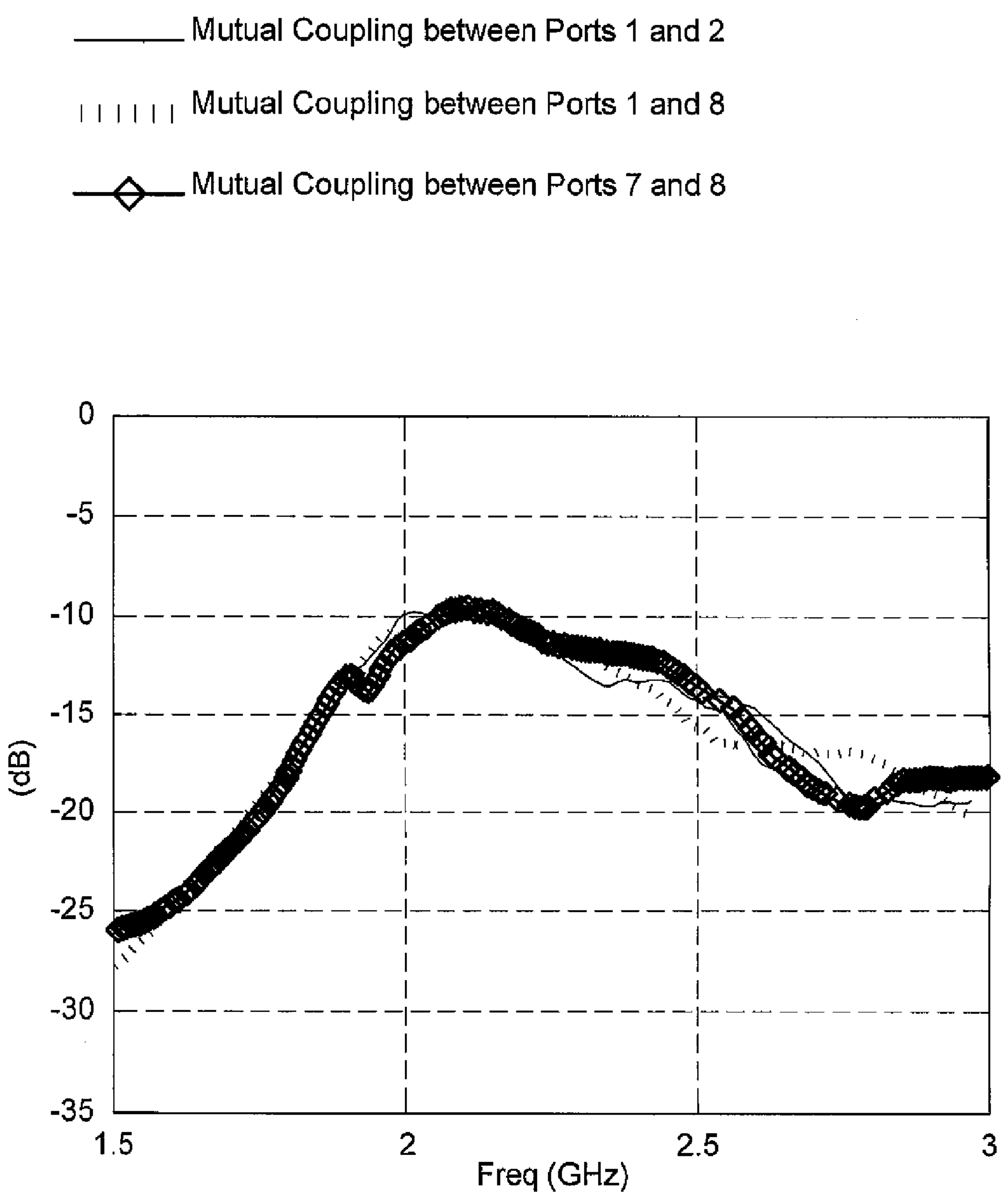
FIG. 6 is a graph of mutual coupling characteristics amongst various ports for the V-shaped antenna elements of FIG. 1.
Figure 7:
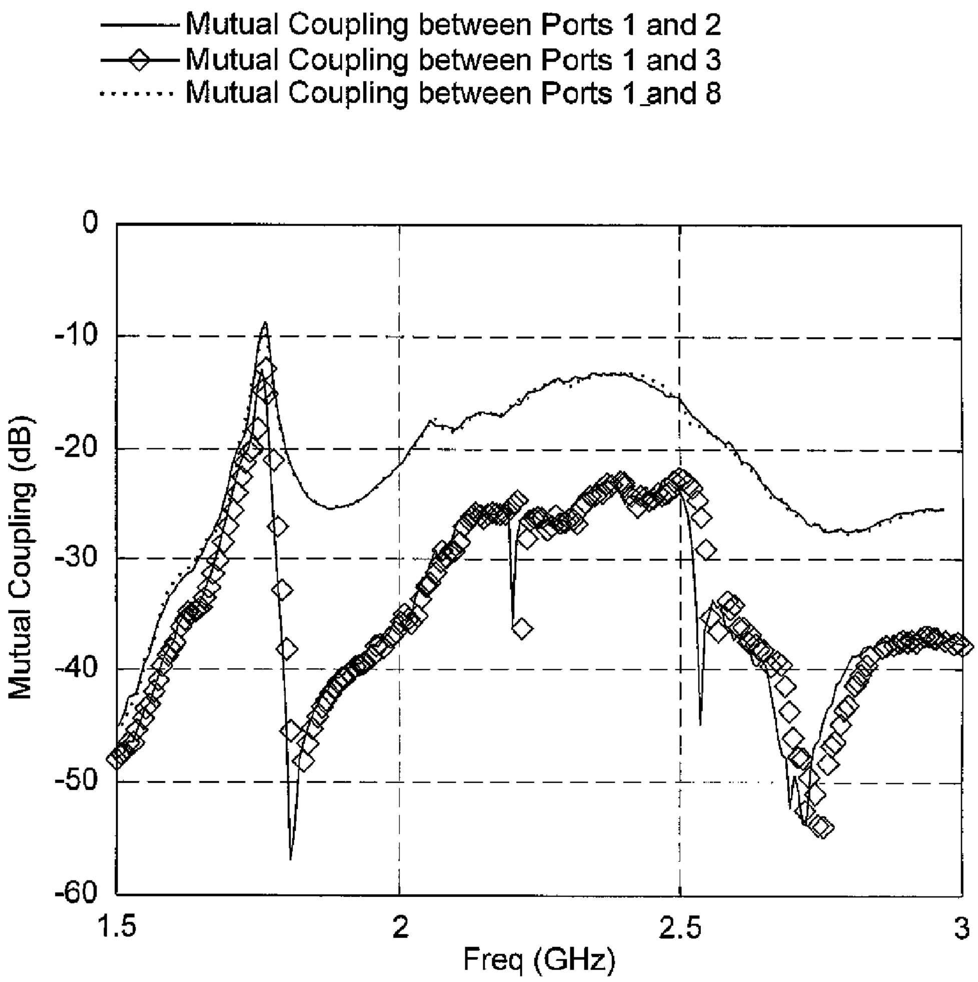
FIG. 7 is a graph of mutual coupling characteristics amongst various ports for the Yagi antenna elements of FIG. 2.

For an antenna array, mutual coupling between adjacent radiating elements can reduce the radiation efficiency of the antenna. In order to analyze the coupling efficiency for both circular antenna array designs, $S_{xy}$ parameters (x≠y) have been measured and presented in FIG. 6 and FIG. 7 for the V-shaped and the Yagi antenna elements, respectively. From FIG. 6, it is observed that a peak coupling of about −14 dB is achieved at 2.45 GHz, which indicates acceptable isolation between adjacent ports. A similar pattern is observed for the Yagi antenna elements, as shown by the coupling loss graph of FIG. 7. The mutual coupling between the adjacent antenna elements is around −14 dB at the resonant frequency (2.45 GHz), which is considered to be acceptable.

Figure 8:
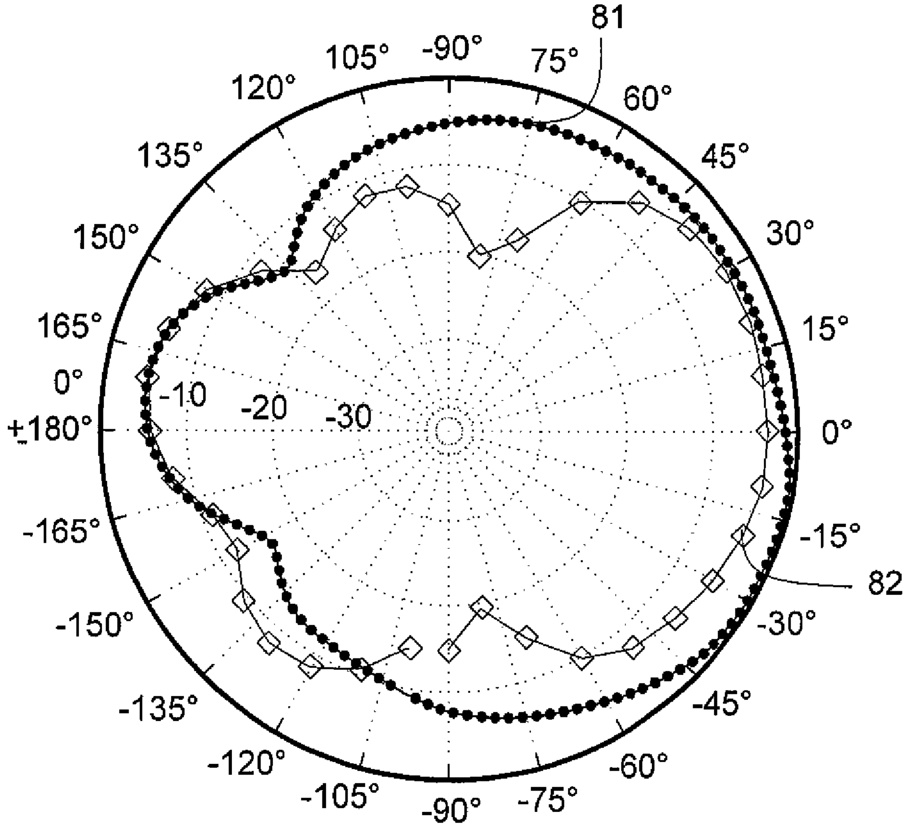
FIG. 8 is a radiation graph showing simulated radiation patterns for the circular antenna arrays shown in FIGS. 1 and 2 with the circular antenna arrays operating under a switched mode.
Figure 9:
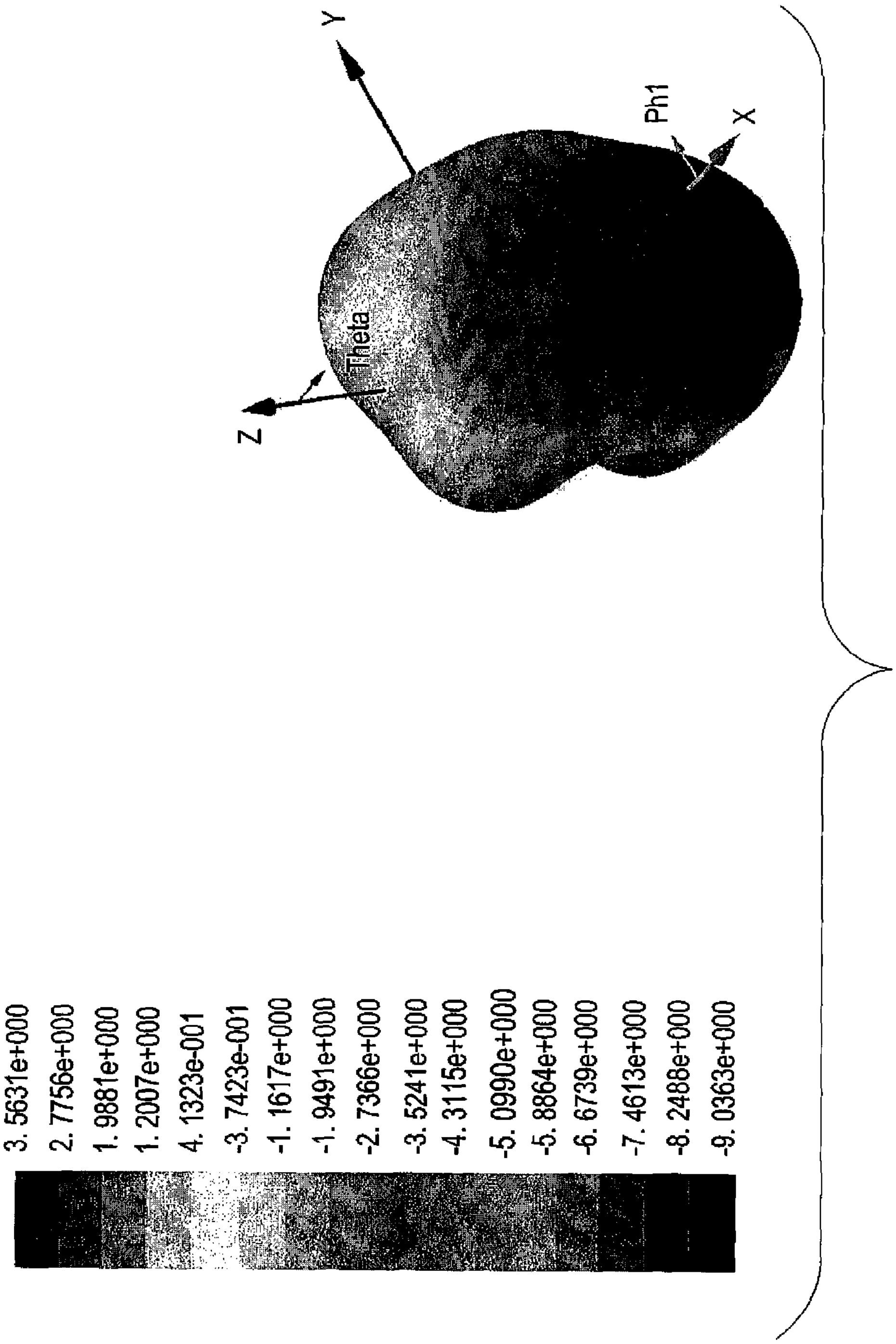
FIG. 9 is a 3D radiation graph showing a simulated radiation pattern for the V-shaped element circular antenna array of FIG. 1 operating under the switched mode.
Figure 10:
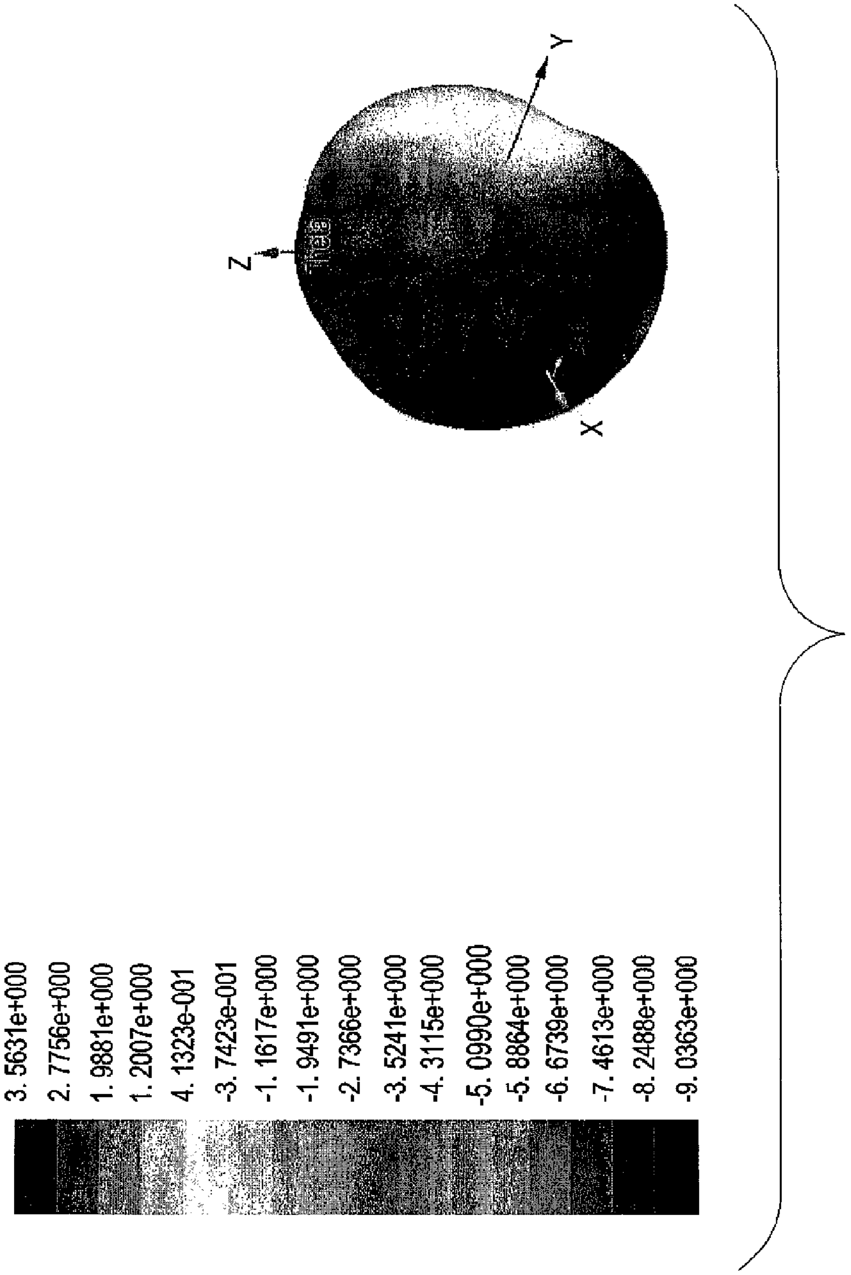
FIG. 10 is a 3D radiation graph showing a simulated radiation pattern for the Yagi element circular antenna array of FIG. 2 operating under the switched mode.

FIG. 8 shows the simulated radiation patterns 81, 82 for the V-shaped circular antenna array 10 and the Yagi circular antenna array 30, respectively, operating under the switched mode of excitation, i.e., exciting one element at a time, for the azimuth plane (θ=90°). As observed from FIG. 8, the V-shaped configuration has a significantly higher HPBW) (≈120° as compared to the Yagi antenna array (≈100°). However, the Yagi antenna array does show a relatively higher level of side lobe at ϕ=223°. Ideally, each element of the array should cover 45° out of the 360° in azimuth. In switched mode, the HPBW is wider than needed, but can still give a sense of direction towards the correct signal location based on the power level obtained from that sector. The simulated 3-D radiation patterns for the V-shaped and the Yagi antenna arrays are presented in FIG. 9 and FIG. 10, respectively.

Figure 11:
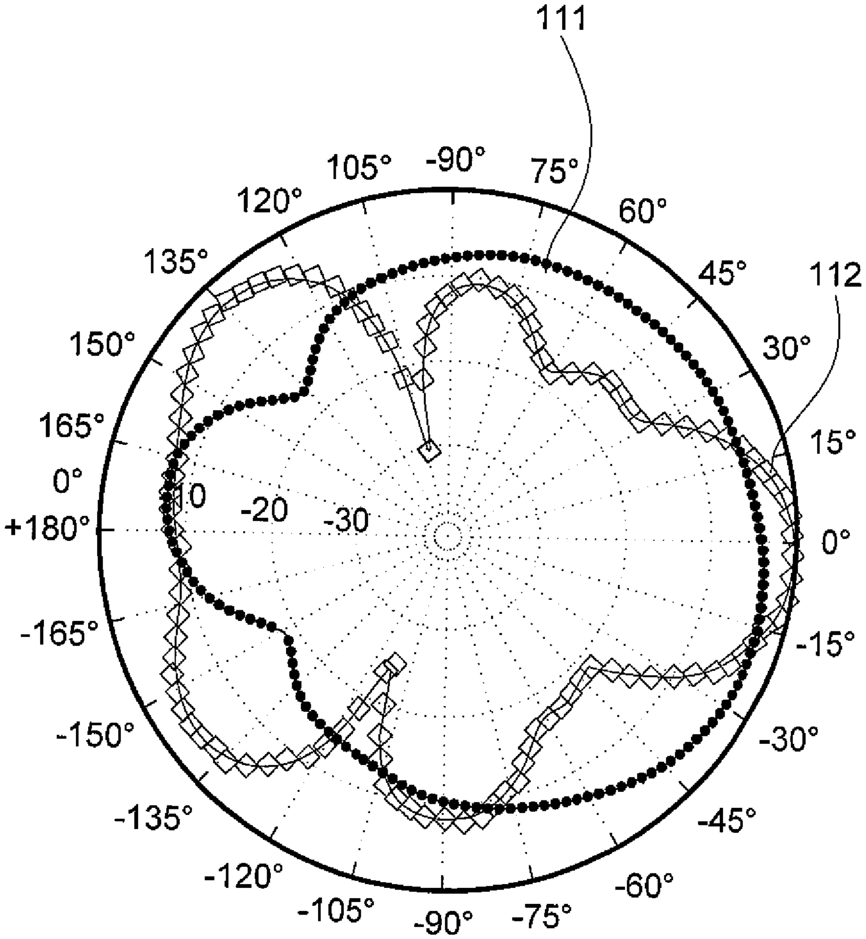
FIG. 11 is a radiation graph showing simulated radiation patterns for the V-shaped element circular antenna array of FIG. 1, comparing radiation patterns between the switched and phased modes.
Figure 12:
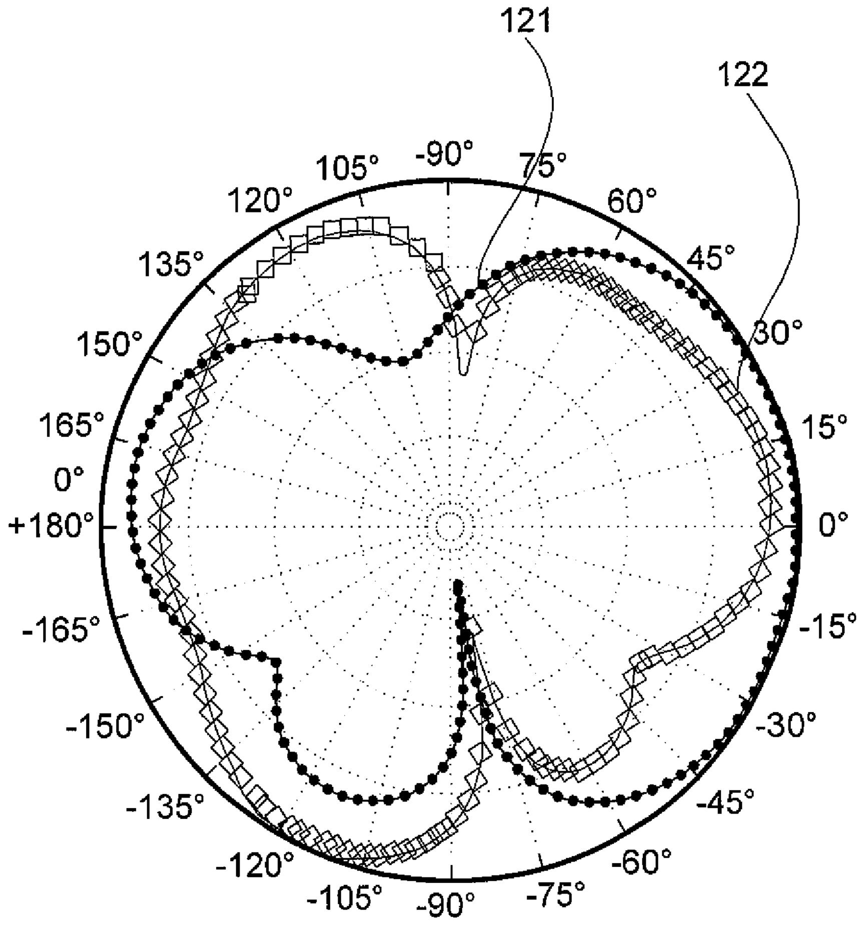
FIG. 12 is a radiation graph showing simulated radiation patterns for the Yagi element circular antenna array of FIG. 2, comparing radiation patterns between the switched and phased modes.

In order to reduce the HPBW, for accurate direction estimation, both the antenna array configurations were excited using the phased mode. All elements were provided identical excitation magnitude of 1 V with different phases. The azimuth radiation patterns for the V-shaped design presented in FIG. 11 shows a sharp decrease in the HPBW for the phased excited 112 case (≈34°), as compared to the switched mode of excitation 111. Additionally, the narrower HPBW also provides an approximately 3 dB increase in the directivity of the antenna array at the cost of side lobes at ϕ=135° and 223°. FIG. 12 shows the azimuth radiation patterns for the Yagi antenna array. Unlike the V-shaped array, the Yagi antenna array, when operated under the phased excitation 122, shows a slight decrease in the directivity in the desired direction (ϕ=0°), and high levels of side lobes are obvious, as compared to the switched mode of excitation 121.

Figure 13:
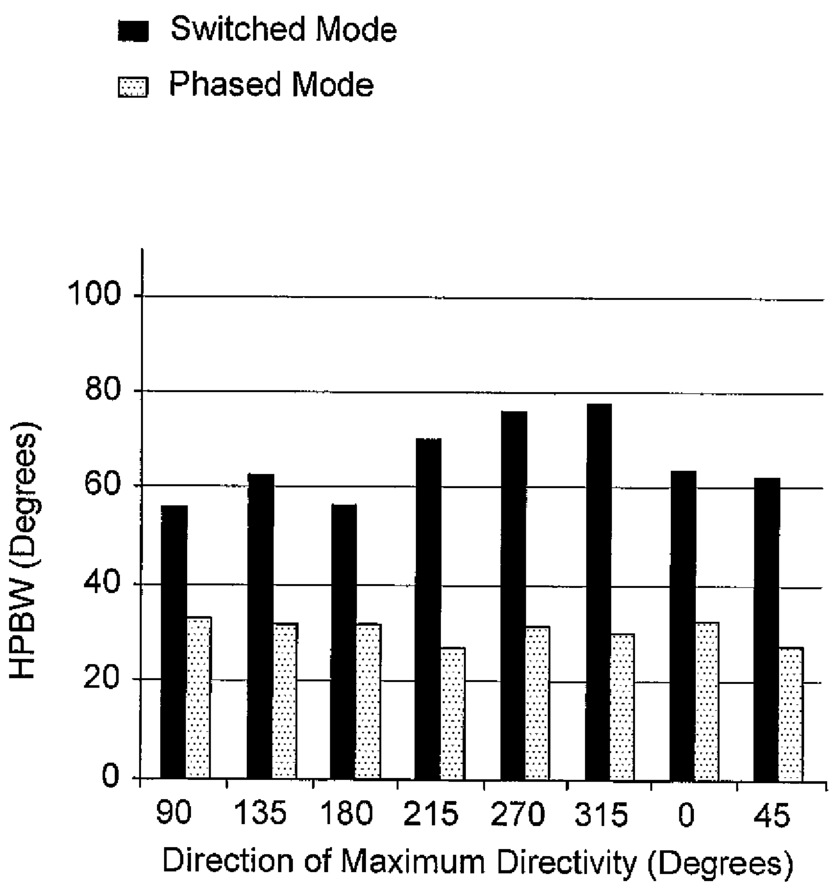
FIG. 13 is an HPBW graph for the V-shaped element circular antenna array of FIG. 1 operating in switched and phased modes under simulated installed conditions.
Figure 14:
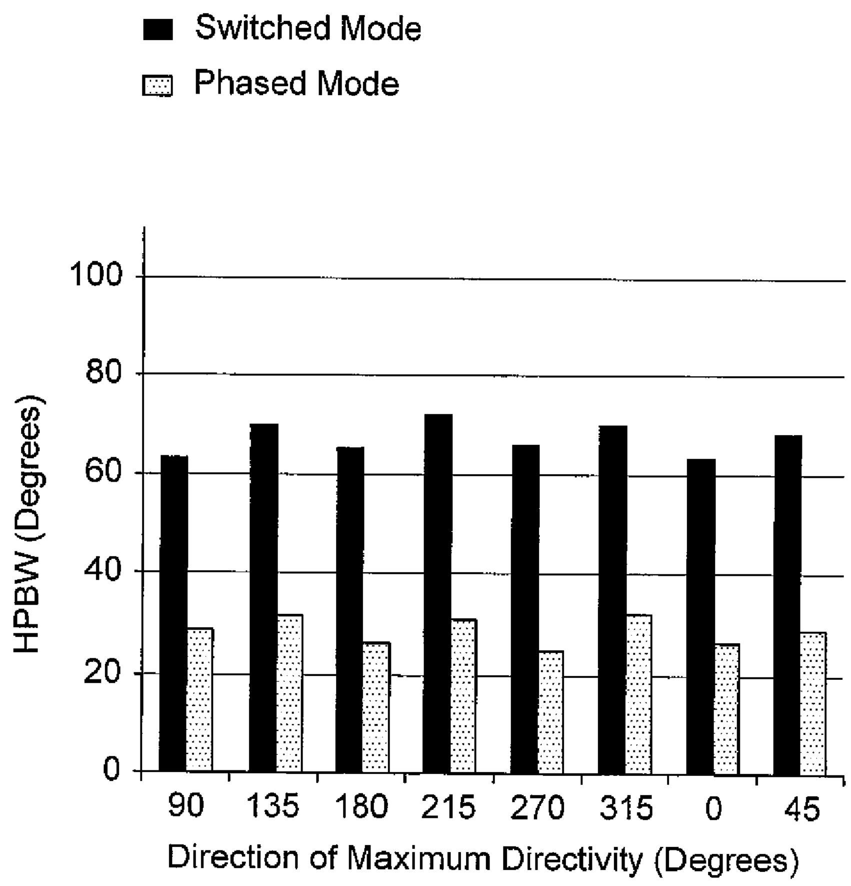
FIG. 14 is an HPBW graph for the Yagi element circular antenna array of FIG. 2 operating in switched and phased modes under simulated installed conditions.

Since the circular antenna array 10, 30 are to be installed on top of vehicles, the effect of the roof of the vehicle must be taken into account for correct understanding of the antenna operation. The vehicle roof has been simulated by considering a large reflecting surface placed under the antenna array. This large reflecting surface mimics the effect the vehicle roof has on the radiation and provides a much closer understanding of antenna behavior. FIG. 13 and FIG. 14 show the HPBW comparison between the switched and the phased modes of excitations for the V-shaped and the Yagi antenna arrays 10, 30, respectively. As observed, the presence of the ground plane caused an average decrease of 45° for the V-shaped antenna array 10, and 30° for the Yagi antenna array 30, which is well within the margin of error for localization purposes.

It is to be understood that the present invention is not limited to the embodiments described above, but encompasses any and all embodiments within the scope of the following claims.

We claim:

1. A circular antenna array for vehicular direction finding applications, comprising:
- a circular disc constructed from dielectric material, the disc having a concentric hole of a given diameter, and top and bottom sides;
- a concentric, circular ground plane formed on the bottom side of said circular disc; and
- a plurality of directional microstrip antennas radially spaced at equal angles around the hole, the plurality of antennas having elements disposed on the top and bottom sides of the disc, the plurality of antenna elements being microstrip elements of conductive material, wherein each said directional microstrip antenna comprises:
  - a top leg extending radially from the concentric hole formed through the circular disc and being mounted on the top side thereof:
  - a top arm extending from a distal end of the top leg;
  - a bottom neck extending radially from the concentric, circular ground plane and being mounted on the bottom side of the circular disc; and
  - a bottom arm extending from a distal end of the bottom neck.

2. The circular antenna arrays for vehicular direction finding applications according to claim 1, wherein for each said directional microstrip antenna, the top leg and the top arm form an acute angle, defining a V-shaped antenna, and the bottom neck and the bottom arm form an acute angle below the V-shaped antenna, the angle of the bottom arm being mirror opposite from the corresponding top arm when viewed from the top of said disc.

3. The circular antenna arrays for vehicular direction finding applications according to claim 2, further comprising a lateral gap separating said top leg and said bottom neck.

4. The circular antenna arrays for vehicular direction finding applications according to claim 1, wherein for each said directional microstrip antenna, the top leg and the top arm form a right angle, and the bottom neck and the bottom arm form a right angle, the bottom arm extending 180° opposite from the top arm.

5. The circular antenna arrays for vehicular direction finding applications according to claim 4, further comprising an elongate director strip disposed on the top side of said disc parallel to the top arm and radially spaced from the top arm, said antenna being a microstrip Yagi antenna.

6. A system for locating vehicles, comprising;
- a key fob having:
  - a key fob housing;
  - a microwave radio transmitter disposed in the housing for selectively generating an RF beacon signal;
  - a microwave radio receiver disposed in the housing; and
  - an LED panel mounted on the housing, the LED panel being connected to the microwave radio receiver;
- a circular antenna array adapted for installation on a vehicle, the circular antenna array having;

a circular disc constructed from dielectric material, the disc having a concentric hole of a given diameter, and top and bottom sides;

a concentric, circular ground plane formed on the bottom side of said circular disc; and a plurality of directional microstrip antennas radially spaced at equal angles around the hole, the plurality of antennas having elements disposed on the top and bottom sides of the disc, the plurality of antenna elements being microstrip elements of conductive material, wherein each said directional microstrip antenna comprises:

a top leg extending radially from the concentric hole formed through the circular disc and being mounted on the top side thereof;

a top arm extending from a distal end of the top leg;

a bottom neck extending radially from the concentric, circular ground plane and being mounted on the bottom side of the circular disc; and a bottom arm extending from a distal end of the bottom neck;

a circuit for determining which of the antennas received the beacon signal from the key fob with the strongest strength, and for transmitting a response signal to the key fob receiver in the direction of the beacon signal from the antenna receiving the beacon signal with the strongest strength, the circuit including:

an electronic rotating switch connected to the antennas, the rotating switch selectively activating each of the antennas one at a time;

a front end circuit connected to the rotating switch, the front end circuit having an amplifier and an analog-to-digital converter for amplifying and conditioning the beacon signal received the antennas for processing;

a demodulator circuit connected to the front end circuit for converting the received beacon signal from a carrier frequency of 2.45 GHz to a basic intermediate frequency (IF) range;

a digital signal processor circuit connected to the demodulator circuit, the digital signal processor circuit having a time delay circuit for estimating arrival time of the received beacon signal and a direction of arrival circuit for estimating direction of the received beacon signal;

wherein reception of the response signal from the circular antenna array activates the LED panel to assist a user in determining user proximity to the vehicle being located.

7. The system for locating vehicles according to claim 6, wherein for each said directional microstrip antenna, the top leg and the top arm form an acute angle, defining a V-shaped antenna, and the bottom neck and the bottom arm form an acute angle below the V-shaped antenna, the angle of the bottom arm being mirror opposite from the corresponding top arm when viewed from the top of said disc.

8. The system for locating vehicles according to claim 7, further comprising a lateral gap separating each said top leg from said corresponding bottom neck.

9. The system for locating vehicles according to claim 6, wherein each antenna comprises a Yagi antenna, the top leg having the top arm extending at a right angle with respect to perpendicular of the top leg, the corresponding bottom neck having the bottom arm extending at a right angle with respect to perpendicular of the top leg, the bottom arm extending 180° opposite from the top arm.

10. The system for locating vehicles according to claim 9, further comprising an elongate director strip disposed on the top side of said disc parallel to the top arm and radially spaced from the top arm.

* * * * *